(12) United States Patent
Hallac et al.

(10) Patent No.: US 9,761,862 B2
(45) Date of Patent: Sep. 12, 2017

(54) POLYSULFONE COATING FOR HIGH VOLTAGE LITHIUM-ION CELLS

(71) Applicant: Johnson Controls Technology Company, Holland, MI (US)

(72) Inventors: Boutros Hallac, Milwaukee, WI (US); Yanting Luo, Milwaukee, WI (US)

(73) Assignee: Johnson Controls Technology Company, Holland, MI (US)

(*) Notice: Subject to any disclaimer, the term of this patent is extended or adjusted under 35 U.S.C. 154(b) by 979 days.

(21) Appl. No.: 13/851,896

(22) Filed: Mar. 27, 2013

(65) Prior Publication Data

US 2013/0260209 A1 Oct. 3, 2013

Related U.S. Application Data

(60) Provisional application No. 61/616,339, filed on Mar. 27, 2012.

(51) Int. Cl.

| | |
|---|---|
| *H01M 4/13* | (2010.01) |
| *H01M 4/131* | (2010.01) |
| *H01M 4/1391* | (2010.01) |
| *H01M 4/04* | (2006.01) |
| *H01M 4/36* | (2006.01) |
| *H01M 4/505* | (2010.01) |
| *H01M 4/525* | (2010.01) |
| *H01M 10/0525* | (2010.01) |

(52) U.S. Cl.
CPC ........ *H01M 4/131* (2013.01); *H01M 4/0485* (2013.01); *H01M 4/1391* (2013.01); *H01M 4/366* (2013.01); *H01M 4/505* (2013.01); *H01M 4/525* (2013.01); *H01M 10/0525* (2013.01)

(58) Field of Classification Search
CPC ..................................................... H01M 4/131
See application file for complete search history.

(56) References Cited

U.S. PATENT DOCUMENTS

| | | |
|---|---|---|
| 5,300,206 A | 4/1994 | Allen et al. |
| 5,658,689 A | 8/1997 | Kawakami et al. |
| 6,180,282 B1 | 1/2001 | Nishida et al. |
| 6,468,223 B2 | 10/2002 | Kaga |
| 6,620,547 B1 | 9/2003 | Sung et al. |

(Continued)

FOREIGN PATENT DOCUMENTS

CN 101222032 7/2008

OTHER PUBLICATIONS

Moon, H-S, et al.; "Characterization of protective-layer-coated LiMn2O4 cathode thin films," Journal of Power Sources, vol. 119-121; Jun. 1, 2003; pp. 713-716.

(Continued)

*Primary Examiner* — Daniel Gatewood
(74) *Attorney, Agent, or Firm* — Fletcher Yoder, P.C.

(57) ABSTRACT

The performance of a lithium ion-cell where the cathode is a layered-layered lithium rich cathode material $xLiMO_2(1-x)Li_2MNO_3$, M being a transition metal selected from the group consisting of Co, Ni, or Mn, is improved by coating the surface of the cathode with a sulfonyl-containing compound, such as poly(1,4-phenylene ether-ether-sulfone), inhibits the reactivity of the electrolyte with the oxidized electrode surface while allowing lithium ion conduction.

25 Claims, 8 Drawing Sheets

(56) References Cited

U.S. PATENT DOCUMENTS

| | | |
|---|---|---|
| 6,677,082 B2 | 1/2004 | Thackeray et al. |
| 6,680,143 B2 | 1/2004 | Thackeray et al. |
| 7,135,252 B2 * | 11/2006 | Thackeray ............ C01G 23/002 |
| | | 423/599 |
| 7,479,348 B2 | 1/2009 | Issaev et al. |
| 7,524,581 B2 | 4/2009 | Issaev et al. |
| 7,544,384 B2 | 6/2009 | Issaev et al. |
| 7,544,445 B2 | 6/2009 | Kinouchi et al. |
| 7,560,192 B2 | 7/2009 | Hwang et al. |
| 7,575,830 B2 | 8/2009 | Kawamura et al. |
| 7,615,314 B2 | 11/2009 | Kawakami et al. |
| 7,736,809 B2 | 6/2010 | Hwang et al. |
| 7,745,048 B2 | 6/2010 | Hwang et al. |
| 7,753,968 B2 | 7/2010 | Boczer et al. |
| 7,785,740 B2 | 8/2010 | Amine et al. |
| 7,803,199 B2 | 9/2010 | Kawakami et al. |
| 7,803,290 B2 | 9/2010 | Kosuzu et al. |
| 7,927,743 B2 | 4/2011 | Inoue et al. |
| 7,972,724 B2 | 7/2011 | Kim et al. |
| 7,981,388 B2 | 7/2011 | Ivanov et al. |
| 7,988,895 B2 | 8/2011 | Takita et al. |
| 8,003,254 B2 | 8/2011 | Bofinger et al. |
| 2004/0241549 A1 | 12/2004 | Cho et al. |
| 2009/0061313 A1 * | 3/2009 | Tadano .................. H01M 2/34 |
| | | 429/217 |
| 2009/0263726 A1 * | 10/2009 | Yamaguchi .......... C07D 317/18 |
| | | 429/324 |
| 2011/0136019 A1 * | 6/2011 | Amiruddin ....... H01M 10/0567 |
| | | 429/332 |
| 2012/0308872 A1 * | 12/2012 | Huang .................. H01M 2/145 |
| | | 429/149 |

OTHER PUBLICATIONS

International Search Report for PCT Application No. PCT/US2013/034184 dated Aug. 20, 2013; 4 pgs.

Xu, B., Fell, C.R. Chi, M. and Meng, Y.S., Energy Environ. Sci. 4 (2011) 2223-2233.

T. Achiha et al., Electrochem. Soc. 156 (2009) A483-A488.

Y-K. Han et al., Journal of Power Sources 187 (2009) 581-585.

CN 201380016359.1 First Office Action dated Feb. 26, 2016.

\* cited by examiner

POLYSULFONE COATING FOR HIGH VOLTAGE LITHIUM-ION CELLS

CROSS-REFERENCE TO RELATED APPLICATIONS

This application claims the benefit under 35 U.S.C. 119(e) of provisional patent application No. 61/616,339, entitled "POLYSULFONE COATING FOR HIGH VOLTAGE LITHIUM-ION CELLS", filed Mar. 27, 2012, the disclosure of which is hereby incorporated by reference for all purposes permitted under the law.

BACKGROUND OF THE INVENTION

Unless otherwise indicated herein, the materials described in this section are not prior art to the claims in this application and are not admitted to be prior art by inclusion in this section. The concepts discussed in this section are known to the inventors but are not necessarily known to others or previously conceived or pursued by others.

The three primary functional components of a lithium-ion battery are a negative electrode, a positive electrode, and an electrolyte. The negative electrode, or anode, of a conventional lithium-ion cell comprises a material that is capable of absorbing or releasing lithium ions, and is typically made from carbon, such as graphite. The positive electrode, or cathode, comprises a lithium-containing material and is typically made from one of the following types of lithium-containing materials: a layered oxide (such as lithium cobalt oxide), a polyanion (such as lithium cobalt phosphate), or a spinel (such as lithium manganese oxide). The electrolyte, which is in communication with the electrodes, is a lithium salt in an organic solvent. The electrochemical roles of the electrodes change between anode and cathode, depending on the direction of current flow through the cell. Typically, the battery also includes a separator, which is a microporous membrane, to prevent contact between the anode and cathode.

Much attention has been focused on the chemistry of the cathode active materials since the selection of the cathode active material has a major impact on the voltage, capacity, life, and safety of a lithium-ion battery. Presently, the layered-layered lithium-rich cathode material $xLiMO_2 \cdot (1-x)Li_2MnO_3$, where M is a transition metal, such as Ni, Mn, Co, has shown great promise for use in lithium-ion batteries for electric vehicles. In fact, layered-layered lithium rich cathode material possesses high specific capacity (250 mAh/g) which is 70% higher than the commercially-used lithium nickel manganese cobalt oxide $LiNi_{1/3}Mn_{1/3}Co_{1/3}O_2$. However, due to the intrinsic oxygen release upon formation, and reactivity with the electrolyte solvents, the cycling performance and rate capability of the layered-layered lithium rich cathode material are compromised. As a consequence, both surface and bulk material have high impedance.

There is, therefore, a need, for a means to improve the performance of lithium-ion cathode material, and in particular layered-layered lithium-rich cathode material.

Since the primary solvents in the electrolyte are cyclic and linear carbonates, their oxidative reactions with the cathode surface lead to irreversible losses and severe capacity fading. There have been attempts in the prior art to control the electrode/electrolyte reactivity. One approach, as reported by Achiha, et al., *J. Electrochem. Soc.*, Vol. 156, pages A483-A488 (2009), has been to replace the highly reactive carbonate-containing solvents with more stable ones that can be fluorinated. A second approach, as reported in Han, et al., *J. Power Sources*, Vol. 187, pages 581-585 (2009), has been to use additives in the electrolyte that can form a protective layer on the oxidized electrode surface. Yet another approach has been to coat the cathode surface with a material that will inhibit the reactivity of the oxidized electrolyte with the electrode surface, while allowing lithium-ion conduction.

SUMMARY

In one embodiment of the invention, an electrochemical cell for a lithium-ion battery has a negative electrode (anode), which is typically graphite, a positive electrode (cathode) having a lithium-ion containing active material, and an electrolyte in communication with the electrodes. The cathode is provided with a protective coating of a sulfone-containing compound to inhibit reaction at the cathode surface by the oxidized electrolyte. The protective coating does not interfere with lithium-ion conduction.

In the practice of the invention, the active material of the cathode can be any lithium-ion containing material, such as layered metal oxides and spinel oxides, that operates at voltages greater than 4.2V vs $Li/Li^+$. In a particularly preferred embodiment of the invention, however, the active material is the layered-layered lithium rich cathode material $xLiMO_2$ $(1-x)Li_2MNO_3$, where M is a transition metal, and preferably a transition metal selected from the group consisting of Co, Ni, and Mn. In the specific illustrative embodiments reported herein, the layered-layered lithium rich cathode material is $LiMO_2 \cdot Li_2MnO_3$.

The protective coating is a sulfone-containing compound, such as a polysulfone that forms a polymeric coating anchored to the cathode so that the sulfone does not react in any way with the anode. In specific embodiments, the polysulfone is a large molecule selected from the group consisting of polyphenylsulfone and poly(1,4-phenylene ether-ether-sulfone).

A lithium-ion battery embodiment of the invention has multiple electrochemical cells wherein the lithium-ion containing active material on the cathodes have a protective coating of a sulfone-containing compound on the electrolyte-contacting surface. Of course, the battery can be in any configuration, such as coin or button, rolled, or flat as is known in the art.

In a method embodiment, a polysulfone coating for the cathode of a lithium-ion cell is made by dissolving a sulfone-containing compound in a solvent to make a solution which is between about 0.5 to 10% by weight, and preferably about 2%-3% by weight; and depositing the solution on the surface of the lithium-ion containing active material of a cathode to form a coating. In preferred embodiments, the deposited coating has a thickness ranging from about 0.01 to 20 μm, and preferably from about 2 to 5 μm.

BRIEF DESCRIPTION OF THE DRAWINGS

The invention can be better understood with reference to the following drawing figures and detailed description. It should be appreciated that the components in the various figures are not necessarily to scale, emphasis instead being placed upon illustrating the principles of the invention. Briefly, the detailed description is given with reference to the several figures of the drawings, in which.

DETAILED DESCRIPTION

Figure 1:
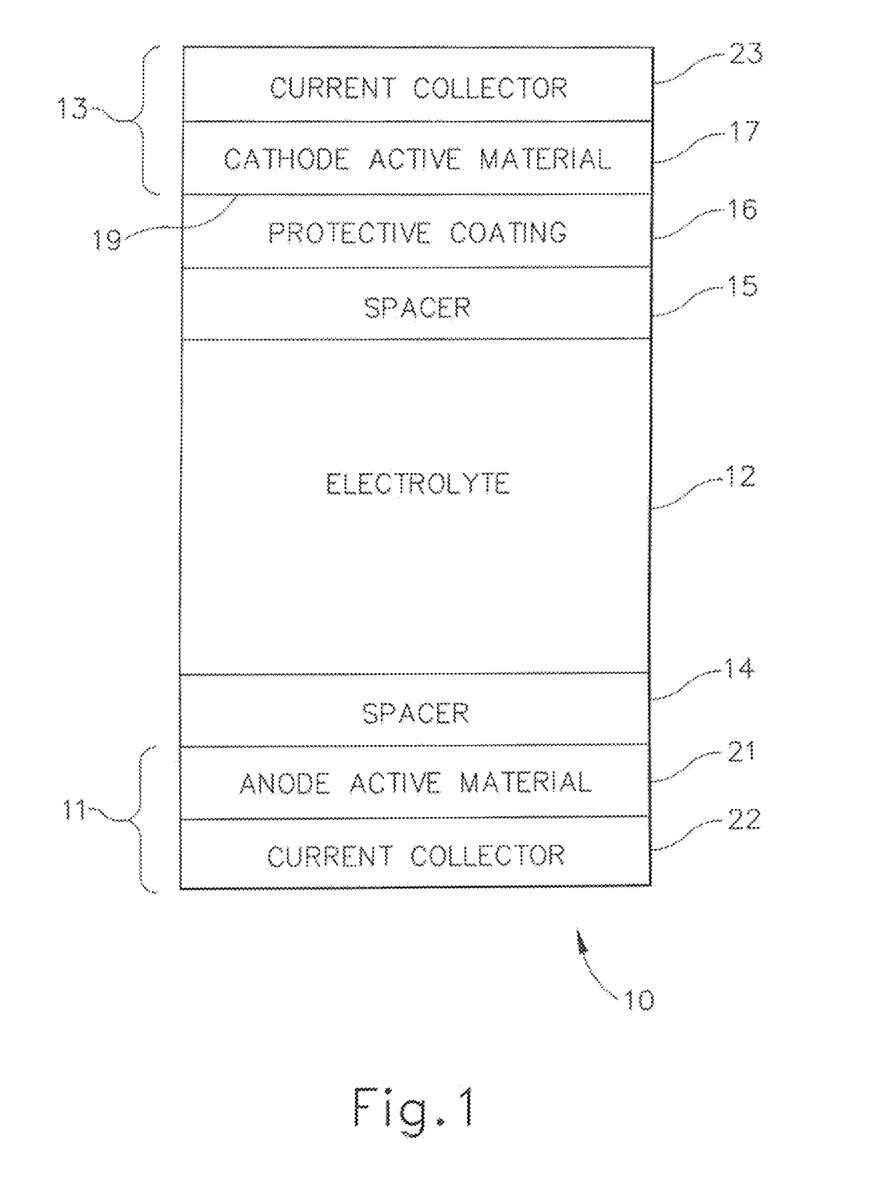
FIG. 1 is a simplified schematic of an electrochemical cell arrangement of the present invention.

FIG. 1 is a simplified schematic of an electrochemical cell arrangement 10 for a lithium-ion battery in accordance with the present invention. Electrochemical cell arrangement 10 has an anode (negative electrode) 11, a cathode (positive electrode) 13, and an electrolyte 12 that is in communication with both the anode and cathode. In this embodiment, spacers 14 and 15 are shown, which may be are microporous membranes that prevent direct contact between anode 11 and cathode 13. As shown in FIG. 1, the cathode 13, includes a cathode active material 17 and current collector 18, is provided with a protective coating 16 on its surface 19 that is in contact with electrolyte 12. Protective coating 16 is a sulfone-containing compound, such as poly(1,4-phenylene ether-ether-sulfone), that inhibits the reactivity of the electrolyte at the cathode surface 19.

Anode 11 includes anode active material 21 which can be any material that is capable of absorbing and releasing lithium ions. This specifically includes all types of carbonaceous materials, such as graphitic carbon or hard carbon, silicon and alloys of silicon, lithium titanium oxide, as are known in the art, as well as new materials being developed, such as nanocarbons. Anode 11 includes a conductive terminal, or current collector 22, which is in contact with anode active material 11. In some embodiments, the current collector also functions as a support for the active material. The current collector for the anode includes, but is not limited to, nickel or copper foil or mesh, as is known in the art.

The cathode active material 17 can be any lithium-ion containing material that operates at voltages greater than 4.2V vs $Li/Li^+$. This includes layered metal oxides, such as the commercially available layered metal oxide, $LiN_{1/3}Mn_{1/3}Co_{1/3}O_2$ which has a ratio of Li Mn Co of 1:1:1, as well as polyanions, such as lithium nickel or cobalt phosphates, and spinels. In a particularly preferred embodiment, the cathode active material is the layered-layered lithium rich cathode material $xLiMO_2$ $(1-x)Li_2MNO_3$, where M is a transition metal, and particularly the transition metals Ni, Mn, and Co, Layered-layered lithium rich materials are described in U.S. Pat. Nos. 6,677,082; 6,680,143; 7,135,252; and 6,468,223, for example.

Of course, the cathode 13 also includes a conductive terminal, or current collector 23, which may function as a support for the active material. A current collector for the cathode may be an aluminum or copper foil. In an illustrative example, a lithium-metal oxide, such as NMC, is admixed with a conducting agent, such as graphite; a polymeric binder, such as polyvinylidene fluoride; and a solvent to form a cathode active material, or paste. The paste can contain other additives as is known in the art. The paste is coated directly, on an aluminum collector and dried to form the cathode, which may be in the form of a plate.

Figure 5:
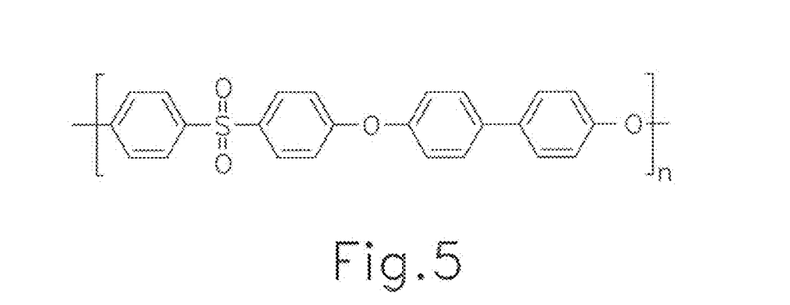
FIGS. 5 and 6 are the chemical structures of two polysulfone (PS) compounds that can be used in the practice of the invention, specifically polyphenylsulfone (PPS) and poly(1,4-phenylene ether-ether-sulfone)(PPEES), respectively.
Figure 6:
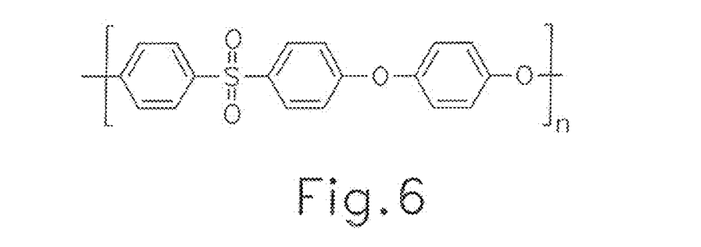

In accordance with the invention, cathode 13 is provided with a protective coating 16 on the cathode surface 19 that interfaces with the electrolyte. The protective coating 16 comprises a sulfone-containing polymer. A sulfone is a chemical compound that has one or more sulfonyl functional groups. A sulfonyl functional group contains a central hexavalent sulfur atom that is double bonded to each of two oxygen atoms and has a single bond connection to each of two carbon atoms. The sulfonyl functional group is shown in FIGS. 5 and 6 which are the molecular structures of two specific sulfone-containing compounds that are useful in the practice of the invention: polyphenylsulfone (PPS) and poly(1,4-phenylene ether-ether-sulfone)(PPEES), respectively. Polysulfones are available commercially from Sigma Aldrich, for example. It is to be understood, however, that these two compounds are illustrative, and that any compound having a sulfonyl functional group can be used in the practice the invention.

In an illustrative method of making a coated cathode in accordance with the invention, a sulfone-containing compound is dissolved in a polar solvent to form a solution (e.g., 0.5 to 10% by weight). The solution is deposited on the surface of a cathode and dried. Of course, the solution can be deposited on the cathode surface by any known means, such as solvent casting, rolling or spraying. Typical thickness of the applied coating range from about 0.01 μm to 20 μm and preferably 2 μm to 5 μm. The thickness of the coating can be controlled by modifying solution viscosity, weight percentage of polymer in the solution, as well as by the coating technique. In a specific illustrative embodiment, the coated cathode was dried under a vacuum at 100° C. for 4 hours, followed by overnight drying at 50° C. to ensure solvent evaporation. Of course, these times and temperatures, as well as the coating techniques, are illustrative.

In one preferred method embodiment, the solvent is N-Methylpyrrolidone (NMP). NMP, is chemically stable and a powerful polar solvent, making it ideal for use in the practice of the invention where an inert medium advantageously avoids reaction of the solvent with the cathode surface. Other solvents that can be used in the practice of the invention, include, but are not limited to, dimethylsulfoxide, N,N-dimethylformamide, and tetrahydrofuran.

The electrolyte may be a mixture of organic carbonates such as ethylene carbonate or diethyl carbonate containing complexes of lithium ions, as is known in the art. These non-aqueous electrolytes generally use non-coordinating anion salts, illustratively lithium hexafluorophosphate (LiPF$_6$), lithium hexafluoroarsenate monohydrate (LiAsF$_6$), lithium perchlorate (LiClO$_4$), lithium tetrafluoroborate (LiBF$_4$), or lithium triflate (LiCF$_3$SO$_3$). The protective coating inhibits reactivity with the cathode active material that would otherwise occur at the cathode surface interface with the electrolyte.

Examples 1 and 2

In two specific embodiments used in the experiments presented herein, the sulfonyl-containing compounds PPS and PPEES, shown in FIGS. 5 and 6, were dissolved in NMP (2% wt.) and cast onto the surface of NMC cathodes. The coatings had a thickness of about between about 2-3 µm.

Example 3

Coin, or button, cells were made using the polysulfone-coated NMC cathode of Examples 1 and 2. The coin cells were used to generate the experimental data reported below. To make the coin cells, a 9/16" negative electrode was placed on top of a 0.5 mm thick spacer which was placed on a washer housed within a negative case that is covered with a gasket to prevent shorting. Electrolyte was placed on the negative electrode to wet its surface. A polyethylene separator was placed on top of the negative electrode, and additional electrolyte was placed on top of the separator. A ½" positive electrode was placed on top of the polyethylene separator and a 1 mm thick spacer was placed on top of the positive electrode. The cell was closed by crimping a positive cap.

Experimental Results

Physical Data

Figure 2A:
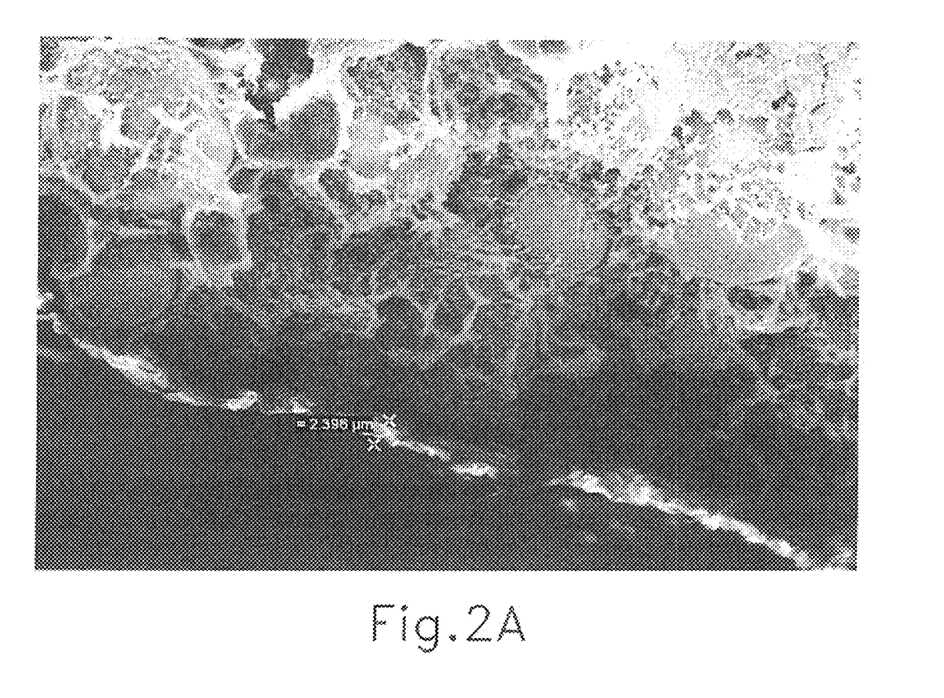
FIG. 2(a) is a scanning electron microscope (SEM) image of a cross-section of a $LiMO_2.Li_2MnO_3$ cathode having a protective coating of a polysulfone on its surface.
Figure 2B:
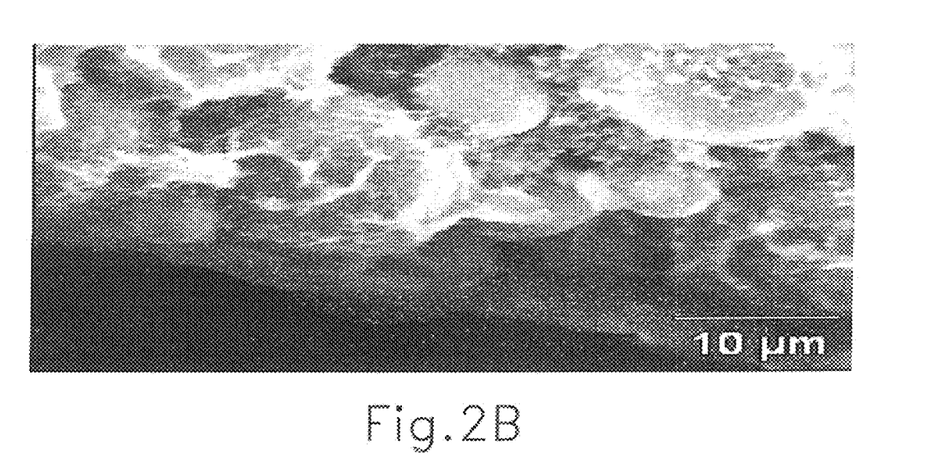
FIG. 2(b) is an SEM image of a polysulfone-coated $LiMO_2.Li_2MnO_3$ cathode with an overlay from elemental mapping for sulfur.
Figure 3A:
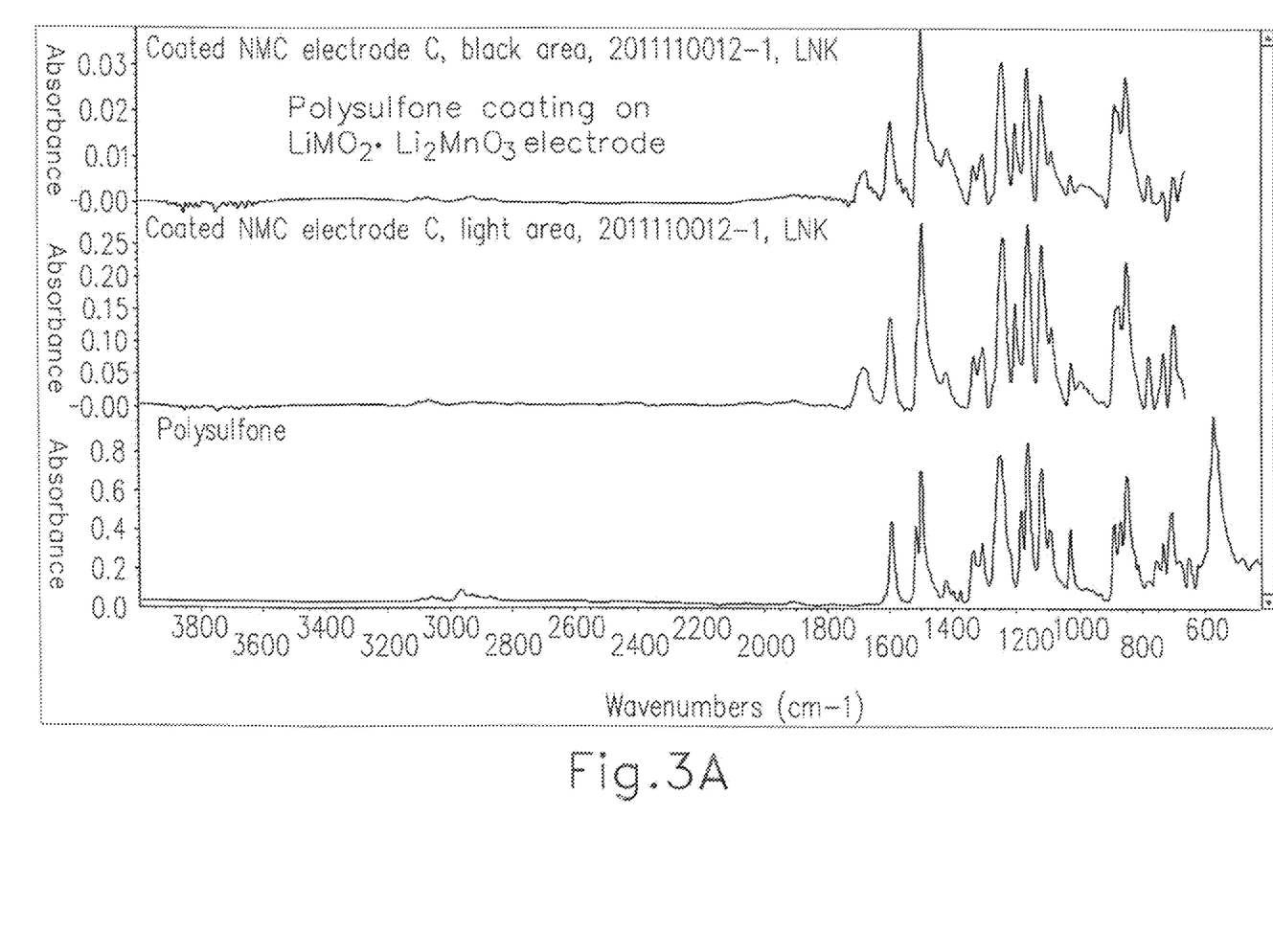
FIGS. 3(a) and 3(b) are Fourier transform infrared spectroscopy (FTIR) spectrographs of samples of a polysulfone-coated $LiMO_2.Li_2MnO_3$ cathode and an uncoated (pristine or bare) $LiMO_2.Li_2MnO_3$ cathode, respectively.
Figure 3B:
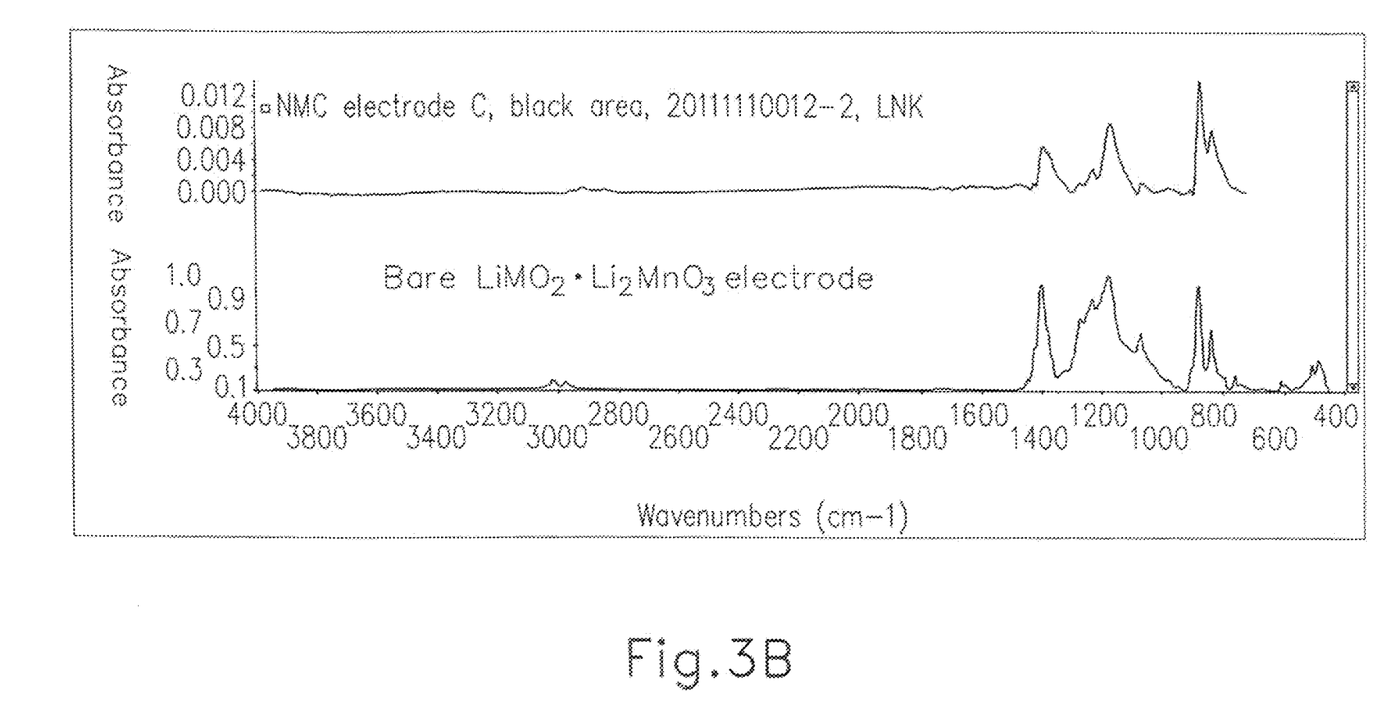

FIG. 2(a) is a scanning electron microscope (SEM) image of a cross-section of an LiMO$_2$.Li$_2$MnO$_3$ cathode having a protective coating of polysulfone on its surface, in particular, the PPEES coating of Example 2 was used to obtain the physical data illustrated in FIGS. 2-3. Referring to the image on FIG. 2(a), the polysulfone coating appears as a white line on the electrode edge. The coating was measured to be about 2.4 µm thick.

The presence of sulfur on the surface of the coated LiMO$_2$.Li$_2$MnO$_3$ cathode is shown in FIG. 2(b) by the green dots which are on an overlay on the SEM image obtained by elemental mapping for sulfur on a SEM image of the polysulfone-coated LiMO$_2$.Li$_2$MnO$_3$ cathode.

Samples of a polysulfone-coated LiMO$_2$.Li$_2$MnO$_3$ cathode and an uncoated LiMO$_2$.Li$_2$MnO$_3$ cathode were subjected to Fourier transform infrared spectroscopy (FTIR). FIGS. 3(a) and 3(b) are the resulting spectrographs, respectively. The FTIR signal assignments for the polysulfone peaks are shown in Table 1:

TABLE 1

| FTIR signal assignments for polysulfone | |
|---|---|
| Wave Number (cm$^{-1}$) | Assignments |
| 1170 | Asymmetric O=S=O stretching of sulfonate group |
| 1150 | Symmetric O=S=O stretching of sulfone group |

TABLE 1-continued

| FTIR signal assignments for polysulfone | |
|---|---|
| Wave Number (cm$^{-1}$) | Assignments |
| 1027 | Symmetric O=S=O stretching of sulfonate group |

Taken together, FIGS. 2-3 confirm the presence of a polysulfone coating on the surface of the LiMO$_2$.Li$_2$MnO$_3$ cathode.

Electrochemical Data

The electrochemical properties of a lithium-ion cell employing the PPS- and PPEES-coated LiMO$_2$.Li$_2$MnO$_3$ cathodes (Examples 1 and 2) and a graphite anode were tested and the results reported in FIGS. 4-10.

Figure 4:
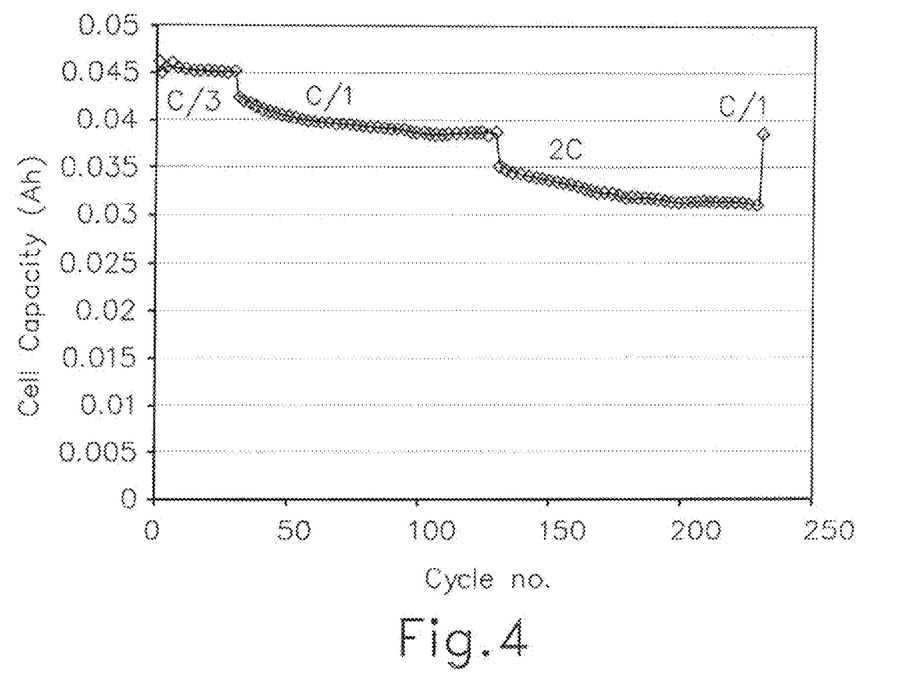
FIG. 4 is a plot of cell capacity in amp hours (Ah) versus cycle number at various discharge rates (C/3; C/1; and 2 C) at constant temperature (23° C.)

FIG. 4 is a plot of cell capacity in amp hours (Ah) versus cycle number at various discharge rates (C/3; C/1; and 2 C) at a constant temperature (23 C). As shown on FIG. 4, the cycle performance is stable for the various rates of discharge.

The rate capacity, coulombic efficiency, and cycle life performance of coin cells made in Example 3 with a coated cathode in accordance with Example 2 were tested and the results shown in FIGS. 7 to 10.

Figure 7A:
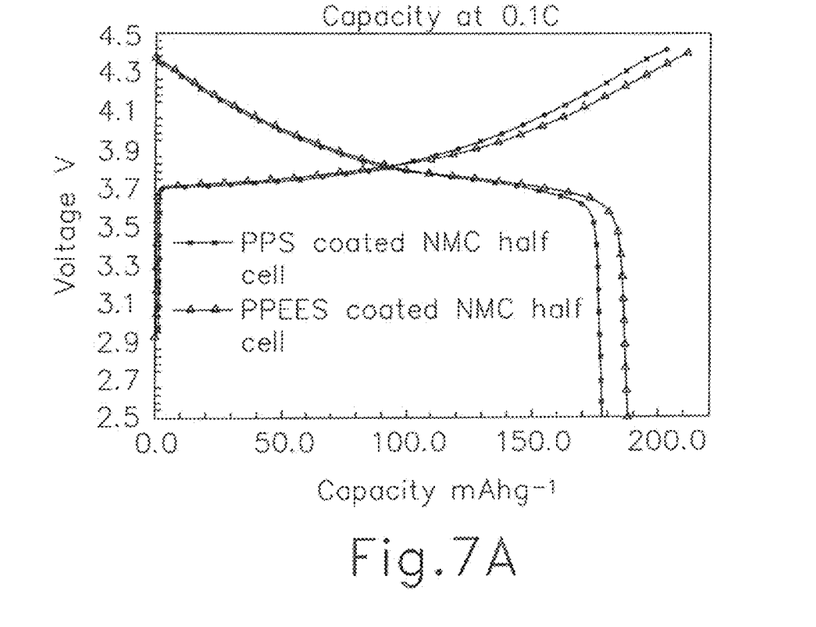
FIG. 7(a) is a graphical representation of the specific capacity of half cell samples of lithium nickel manganese cobalt oxide (NMC) cathodes having protective coatings of either PPS or PPEES.
Figure 7B:
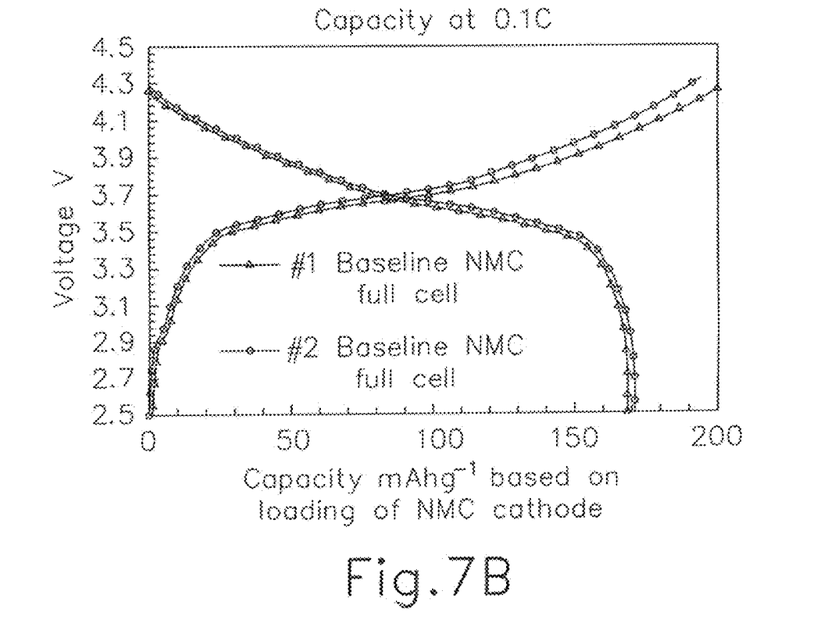
FIG. 7(b) is a graphical representation of the specific capacity of full cell samples of pristine NMC cathode material.

FIGS. 7(a) and 7(b) show the specific capacity of half cell samples employing polysulfone coated NMC cathodes of the present invention, as compared an uncoated samples. FIG. 7(a) is a graphic representation of the applied voltage (V) versus specific capacity (mAHg) at a low discharge rate (0.1 C) for the Polysulfone-coated cathodes of Examples 1 and 2. FIG. 7(b) is graphic representation of the specific capacity (mAHg) at a low discharge rate (0.1 C) plotted against voltage for the uncoated NMC cathode. FIGS. 7(a) and 7(b) show that the polysulfone-coated cathodes exhibit higher specific capacity than the uncoated cathode.

Figure 8:
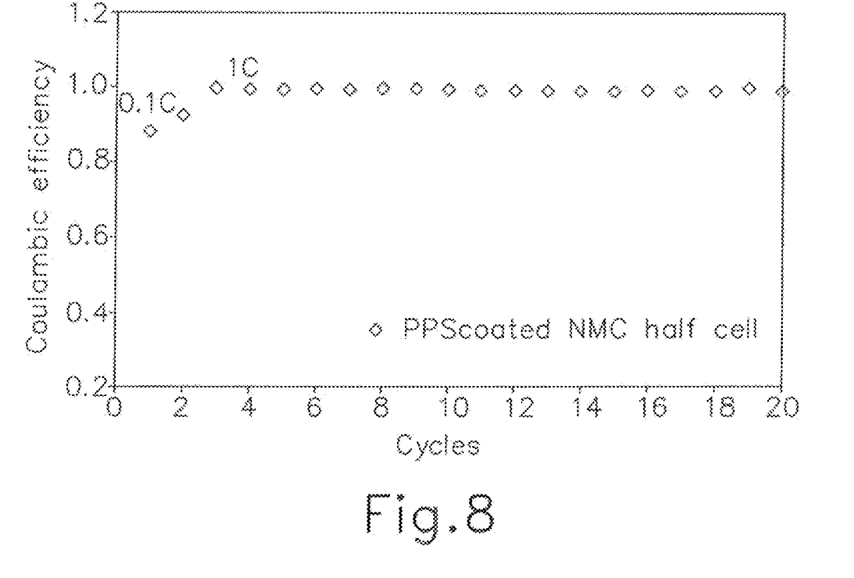
FIG. 8 is a graphic representation of coulombic efficiency plotted against the number of cycles for a PPS-coated NMC cathode half cell.

FIG. 8 is a plot of the coulombic efficiency plotted against the number of cycles for the PPS-coated NMC cathode as prepared in Example 1. Both uncoated and coated NMC half cells reached ~90% charge/discharge retention for the first cycle at a discharge rate of 0.1 C. Afterwards, the efficiencies for both samples reached about 1 at 1 C.

Figure 9:
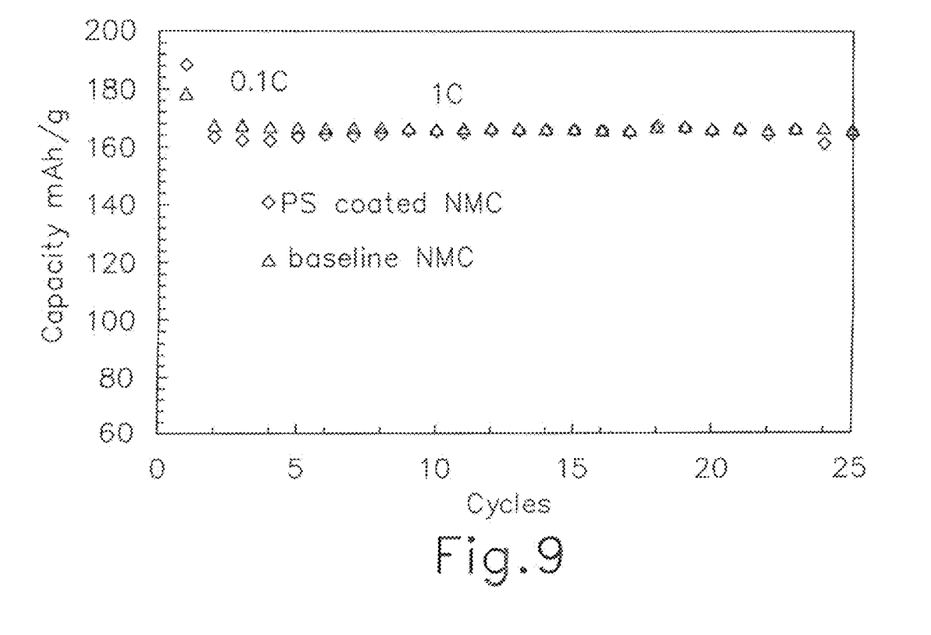
FIG. 9 is a plot of the capacity (mAh/g) versus cycle number for a polysulfone-coated NMC half cell.

FIG. 9, which is a plot of the capacity (mAh/g) versus cycle number, shows that both coated and uncoated NMC samples are stable at 1 C.

Figure 10:
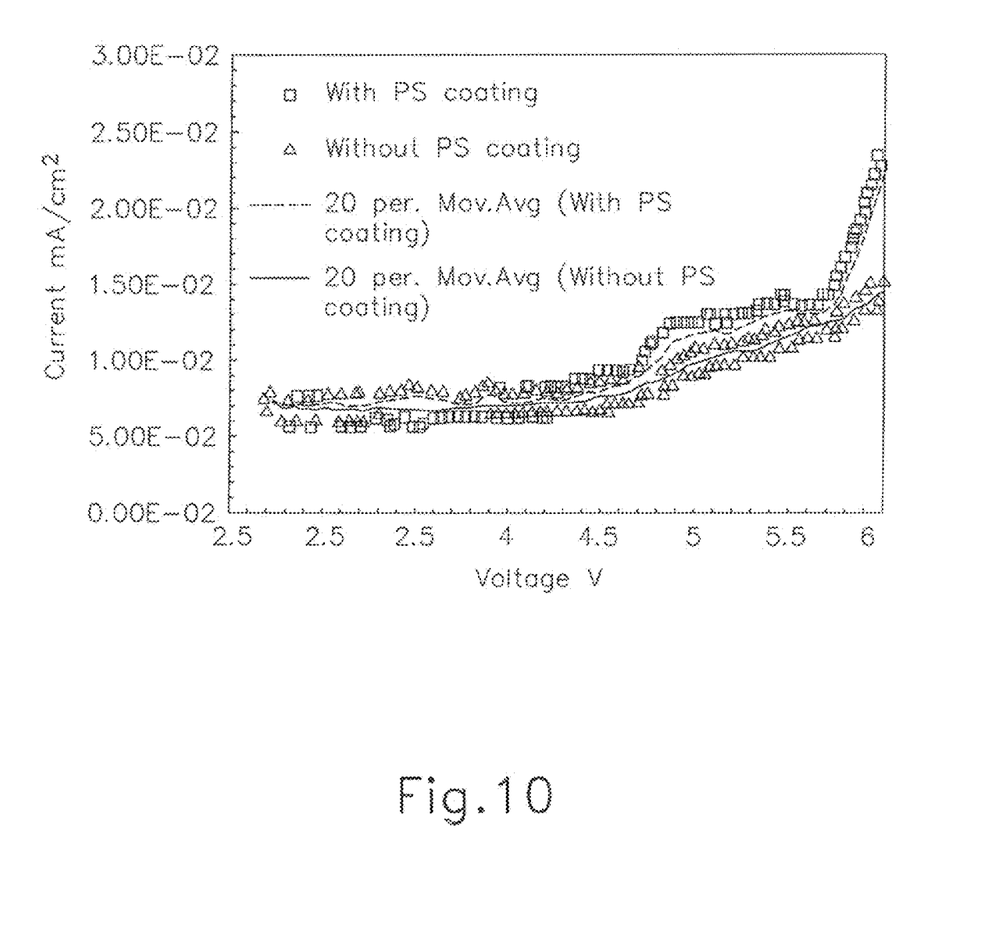
FIG. 10 is a Linear Scan Voltammetry (LSV) plot of current ($mA/cm^2$) against applied voltage (V) for samples of a polysulfone-coated cathode sample and an uncoated cathode.

Linear scan voltammetry (LSV) was used to study the oxidative reaction process at high voltage. FIG. 10 is an LSV from open circuit voltage to 6V for the PS-coated cathode and an uncoated cathode. In an LSV scan, the current at a working electrode is measured while the potential between the working electrode and a reference electrode is swept linearly in time. Oxidation or reduction of a species is registered as a peak or trough in the current signal at the potential at which the species begins to be oxidized or reduced. The current (mA/cm$^2$) is plotted against applied voltage (V).

Referring to FIG. 10, the electrolyte starts to oxidize at ~4.5V for both the PS-coated and uncoated samples. For the PS-coated NMC, another obvious oxidation plateau takes place from 5 to 5.8V, which plateau was properly due to sulfone oxidation. This study shows that sulfone in the PS coating was oxidized later than that of the electrolyte, thereby demonstrating that the PS coating prevents the direct oxidation reaction between the electrolyte and the electrode surface at high voltage. This enlarges the voltage window for lithium ion battery applications employing the technology of the present invention.

To summarize, the experimental results show that the sulfonyl-containing coating inhibits the reaction of the oxidized cathode surface and the electrolyte in a lithium ion cell operating at voltages over 4.6V vs. Li. Good cycle performance was achieved with the coating, and the LSV characterization indicates that the coated electrode is stable up to 5V.

Although the invention has been described in terms of specific embodiments and applications, persons skilled in the art may, in light of this teaching, generate additional embodiments without exceeding the scope or departing from the spirit of the invention described and claimed herein. Accordingly, it is to be understood that the drawing and description in this disclosure are proffered to facilitate comprehension of the invention, and should not be construed to limit the scope thereof.

While certain features and embodiments of the invention have been illustrated and described, many modifications and changes may occur to those skilled in the art without materially departing from the novel teaching and advantages of the subject matter recited in the appended claims. It therefore should be understood that the appended claims are intended to cover all such modification and changes as fall within the true spirit of the invention. Furthermore, in an effort to provide a concise description of the exemplary embodiments, all features of an actual implementation may not have been described which do not relate to the presently contemplated best mode of carrying out the invention or to enabling the claimed invention. It should be appreciated that in the development of any such actual implementation, as in any engineering or design project, numerous implementation specific decisions may be made. Such a development effort might be complex and time consuming, but would nevertheless be a routine undertaking of design, fabrication and manufacture for those of ordinary skill having the benefit of this disclosure, without undue experimentation.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The technical effects and technical problems in the specification are exemplary and are not limiting. It should be noted that the embodiments described in the specification may have other technical effects and can solve other technical problems.

The invention claimed is:

1. An electrochemical cell for a lithium-ion battery, the electrochemical cell having an anode, a cathode, and an electrolyte in communication with the anode and the cathode, wherein the cathode comprises:
  a lithium-ion containing active material; and
  a protective coating of a sulfone-containing compound disposed over the lithium-ion containing active material, wherein the protective coating separates the electrolyte from the active material of the cathode, wherein the protective coating has a thickness between approximately 0.01 micrometers (μm) and approximately 20 μm, and wherein the sulfone-containing compound is selected from the group consisting of polyphenylsulfone and poly(1,4-phenylene ether-ether-sulfone).

2. The electrochemical cell of claim 1, wherein the lithium-ion containing active material operates at voltages over 4.2V vs Li/Li$^+$.

3. The electrochemical cell of claim 1, wherein the lithium-ion containing active material is the layered-layered lithium rich cathode material xLiMO$_2$.(1-x)Li$_2$MnO$_3$, where M is a transition metal, and wherein x is between 0 and 1.

4. The electrochemical cell of claim 1, wherein the transition metal is selected from the group consisting of Co, Ni, and Mn.

5. The electrochemical cell of claim 1, wherein the lithium-ion containing active material is a layered metal oxide.

6. The electrochemical cell of claim 5, wherein the layered metal oxide is Lithium Nickel Manganese Cobalt Oxide (NMC) with Ni:Mn:Co ratios of 1:1:1.

7. The electrochemical cell of claim 1, wherein the anode comprises a carbon-containing material.

8. The electrochemical cell of claim 7, wherein the carbon-containing material is graphite.

9. The electrochemical cell of claim 1, wherein the electrolyte is a non-aqueous mixture of organic carbonates and non-coordinating anion salts of lithium.

10. A lithium-ion battery having multiple electrochemical cells, each electrochemical cell having an anode, a cathode, and an electrolyte in communication with the anode and the cathode, wherein the cathode of each electrochemical cell comprises:
  a lithium-ion containing active material; and
  a protective coating of a sulfone-containing compound disposed over the lithium-ion containing active material, wherein the protective coating separates the electrolyte from the active material of the cathode, wherein the protective coating has a thickness between approximately 0.01 micrometers (μm) and approximately 20 μm, and wherein the sulfone-containing compound is selected from the group consisting of polyphenylsulfone and poly(1,4-phenylene ether-ether-sulfone).

11. The lithium-ion battery of claim 10, wherein the lithium-ion containing active material operates at voltages over 4.2V vs Li/Li$^+$.

12. The lithium-ion battery of claim 11, wherein the lithium-ion containing active material is the layered-layered lithium rich cathode material xLiMO$_2$.(1-x)Li$_2$MnO$_3$, where M is a transition metal, and wherein x is between 0 and 1.

13. The lithium-ion battery of claim 12, wherein the transition metal is selected from the group consisting of Co, Ni, and Mn.

14. The lithium-ion battery of claim 13, wherein the lithium-ion containing active material is a layered metal oxide.

15. The lithium-ion battery of claim 14, wherein the layered metal oxide is Lithium Nickel Manganese Cobalt Oxide (NMC) with Ni:Mn:Co ratios of 1:1:1.

16. The electrochemical cell of claim 1, wherein the lithium-ion containing active material operates at voltages over 4.6V vs Li/Li$^+$.

17. The electrochemical cell of claim 1, wherein the lithium-ion containing active material operates at voltages up to 5V vs Li/Li$^+$.

18. The electrochemical cell of claim 1 wherein the protective coating has a thickness between approximately 2 μm and approximately 5 μm.

19. The lithium-ion battery of claim 10, wherein the lithium-ion containing active material operates at voltages over 4.6V vs Li/Li$^+$.

20. The lithium-ion battery of claim 10, wherein the lithium-ion containing active material operates at voltages up to 5V vs Li/Li$^+$.

21. The lithium-ion battery of claim 10, wherein the protective coating has a thickness between approximately 2 μm and approximately 5 μm.

22. The electrochemical cell of claim 1, comprising a first spacer disposed between the anode and the cathode, wherein the first spacer is a microporous membrane that prevents direct contact between the anode and the cathode.

23. The electrochemical cell of claim 22, wherein the electrochemical cell comprises a second spacer disposed between the anode and the cathode, wherein the second spacer is a microporous membrane that prevents direct contact between the anode and the cathode.

24. The electrochemical cell of claim 23, wherein the first spacer is disposed adjacent to the protective coating of the cathode and the second spacer is disposed adjacent to the anode.

25. The electrochemical cell of claim 24, wherein the first spacer has a thickness of about 1 millimeters (mm) and wherein the second spacer has a thickness of about 0.5 mm.

\* \* \* \* \*

UNITED STATES PATENT AND TRADEMARK OFFICE
CERTIFICATE OF CORRECTION

PATENT NO. : 9,761,862 B2  
APPLICATION NO. : 13/851896  
DATED : September 12, 2017  
INVENTOR(S) : Boutros Hallac and Yanting Luo Page 1 of 1

It is certified that error appears in the above-identified patent and that said Letters Patent is hereby corrected as shown below:

1. In Fig. 3A, Sheet 3 of 8, delete "cm-1" and insert -- $cm^{-1}$ --, therefor.
2. In Fig. 3B, Sheet 4 of 8, delete "cm-1" and insert -- $cm^{-1}$ --, therefor.
3. In Fig. 8, Sheet 7 of 8, delete "Coulambic efficiency" and insert -- Coulombic efficiency --, therefor.
4. In Fig. 8, Sheet 7 of 8, delete "PPScoated" and insert -- PPS coated --, therefor.
5. In Fig. 10, Sheet 8 of 8, delete "2.5 2.5 2.5" and insert -- 2.5 3 3.5 --, therefor.
6. In Column 2, Line 27, delete "$xLiMO_2$ $(1-x)Li_2MNO_3$," and insert -- $xLiMO_2 \cdot (1-x)Li_2MNO_3$, --, therefor.
7. In Column 3, Lines 60-61, delete "anode active material 11." and insert -- anode active material 21. --, therefor.
8. In Column 4, Line 2, delete "Li Mn Co" and insert -- Li:Mn:Co --, therefor.
9. In Column 4, Line 6, delete "$xLiMO_2$ $(1-x)Li_2MNO_3$," and insert -- $xLiMO_2 \cdot (1-x)Li_2MNO_3$, --, therefor.
10. In Column 4, Line 57, delete "NMP," and insert -- NMP --, therefor.
11. In Column 5, Line 2, delete "monohydrate ($LiAsF_6$)," and insert -- ($LiAsF_6$), --, therefor.
12. In Column 5, Line 40, delete "of an" and insert -- of a --, therefor.
13. In Column 6, Line 21, delete "(23 C)." and insert -- (23° C). --, therefor.
14. In Column 6, Line 33, delete "(mAHg)" and insert -- (mAH/g) --, therefor.
15. In Column 6, Line 35, delete "is" and insert -- is a --, therefor.
16. In Column 6, Line 36, delete "(mAHg)" and insert -- (mAH/g) --, therefor.
17. In Column 8, Line 10, in Claim 3, delete "claim 1," and insert -- claim 2, --, therefor.
18. In Column 8, Line 14, in Claim 4, delete "claim 1," and insert -- claim 3, --, therefor.
19. In Column 9, Line 1, in Claim 18, delete "claim 1" and insert -- claim 1, --, therefor.

Signed and Sealed this  
Twenty-seventh Day of February, 2018

Andrei Iancu  
*Director of the United States Patent and Trademark Office*